(12) United States Patent
Takahashi et al.

(10) Patent No.: US 8,838,288 B2
(45) Date of Patent: Sep. 16, 2014

(54) ROLLOVER DETECTION APPARATUS FOR VEHICLE

(71) Applicant: Denso Corporation, Kariya (JP)

(72) Inventors: Hisashi Takahashi, Kariya (JP); Hiroshi Higuchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/846,010

(22) Filed: Mar. 18, 2013

(65) Prior Publication Data

US 2013/0253729 A1    Sep. 26, 2013

(30) Foreign Application Priority Data

Mar. 21, 2012  (JP) .................................. 2012-63648

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60R 21/0132* | (2006.01) | |

(52) U.S. Cl.
CPC ............ *G06F 17/00* (2013.01); *B60R 21/0132* (2013.01)
USPC .................................. 701/1; 701/70; 701/29.1

(58) Field of Classification Search
CPC .... B60R 21/013; B60R 21/0132; G06F 17/00
USPC .............................................. 701/1, 70, 29.1
See application file for complete search history.

(56) References Cited

U.S. PATENT DOCUMENTS

| | | | |
|---|---|---|---|
| 2004/0176897 A1* | 9/2004 | Williams | ........................ 701/70 |
| 2005/0178600 A1* | 8/2005 | Kincaid | ........................ 180/268 |
| 2009/0037057 A1* | 2/2009 | Sygnarowicz et al. | ......... 701/46 |
| 2010/0324774 A1* | 12/2010 | Bouni et al. | .................... 701/29 |
| 2012/0158249 A1* | 6/2012 | Xu et al. | ........................ 701/45 |
| 2012/0259499 A1 | 10/2012 | Hiraoka | |

FOREIGN PATENT DOCUMENTS

| | | |
|---|---|---|
| JP | 2000-006748 A | 1/2000 |
| JP | 2001-260785 A | 9/2001 |
| JP | 2006-044454 A | 2/2006 |
| JP | WO2011-111098 A1 | 9/2011 |

OTHER PUBLICATIONS

Office Action issued Mar. 4, 2014 in corresponding JP Application No. 2012-063648 (with English translation).

* cited by examiner

*Primary Examiner* — Calvin Cheung
*Assistant Examiner* — Paula L Schneider

(57) ABSTRACT

A rollover detection apparatus for a vehicle includes a first vertical acceleration sensor, a second vertical acceleration sensor, and a rollover determining section. The first vertical acceleration sensor is mounted on the vehicle and outputs a first vertical acceleration signal indicative of vertical acceleration of the vehicle. The second vertical acceleration sensor is mounted on the vehicle and outputs a second vertical acceleration signal indicative of the vertical acceleration of the vehicle. The second vertical acceleration sensor is spaced away from the first vertical acceleration sensor in a lateral direction of the vehicle. The rollover determining section determines whether a rollover of the vehicle occurs based on a difference between the first and second vertical acceleration signals.

8 Claims, 2 Drawing Sheets

ROLLOVER DETECTION APPARATUS FOR VEHICLE

CROSS REFERENCE TO RELATED APPLICATION

This application is based on Japanese Patent Application No. 2012-63648 filed on Mar. 21, 2012, the contents of which are incorporated herein by reference.

FIELD

The present disclosure relates to an apparatus for detecting a rollover of a vehicle.

BACKGROUND

In recent years, there have been an increased number of vehicles equipped with a curtain airbag in addition to a front airbag and a side airbag. The front airbag is used in the event of a front collision of a vehicle. The side airbag is used in the event of a side collision of the vehicle. The curtain airbag is used in the event of a rollover of the vehicle. Specifically, in the event of the rollover, the curtain airbag deploys to cover a side window of the vehicle, thereby preventing an occupant from being thrown out of the vehicle.

As disclosed, for example, in JP-A-2006-44454, in a vehicle equipped with a curtain airbag, a roll rate sensor is placed almost in the center of the vehicle to detect a rollover of the vehicle.

In an apparatus disclosed in JP-A-2006-44454, rollover determination is performed by using not only a signal from the roll rate sensor but also a signal from a satellite sensor that is placed on each side of the vehicle to detect a side collision of the vehicle. In such an approach, types of rollovers (flipover, turnover, tripover, and the like) can be identified.

Due to diversification of occupant protection devices, the number of sensors mounted on a vehicle has been increased. Accordingly, the cost of the overall system has been increased. In particular, although a front collision and a side collision can be detected by using an acceleration sensor, a roll rate sensor is necessary to detect a rollover. The addition of the roll rate sensor results in an increase in the cost.

SUMMARY

In view of the above, it is an object of the present disclosure to provide a rollover detection apparatus for detecting a rollover of a vehicle without a roll rate sensor.

According to an aspect of the present disclosure, a rollover detection apparatus for a vehicle includes a first vertical acceleration sensor, a second vertical acceleration sensor, and a rollover determining section. The first vertical acceleration sensor is mounted on the vehicle and outputs a first vertical acceleration signal indicative of vertical acceleration of the vehicle. The second vertical acceleration sensor is mounted on the vehicle and outputs a second vertical acceleration signal indicative of the vertical acceleration of the vehicle. The second vertical acceleration sensor is spaced away from the first vertical acceleration sensor in a lateral direction of the vehicle. The rollover determining section determines whether a rollover of the vehicle occurs based on a difference between the first and second vertical acceleration signals.

BRIEF DESCRIPTION OF THE DRAWINGS

The above and other objects, features, and advantages will become more apparent from the following description and drawings in which like reference numerals depict like elements. In the drawings.

DETAILED DESCRIPTION

An embodiment of the present disclosure is described below with reference to the drawings.

Figure 1:
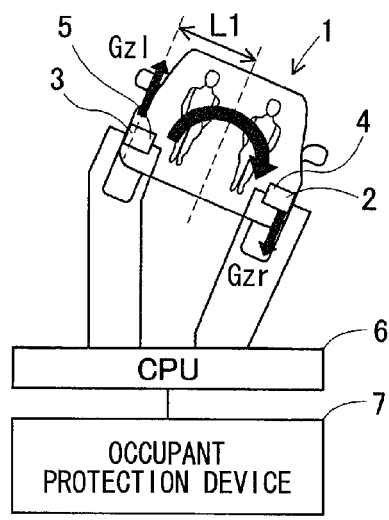
FIG. 1 illustrates a vehicle equipped with a rollover detection apparatus according to an embodiment of the present disclosure.

As shown in FIG. 1, a vehicle 1 has vertical acceleration sensors 2 and 3 and also has lateral acceleration sensors 4 and 5. The vertical acceleration sensor 2 and the lateral acceleration sensor 4 are paired together and mounted on right side of the vehicle 1. The vertical acceleration sensor 3 and the lateral acceleration sensor 5 are paired together and mounted on left side of the vehicle 1.

The pair of the vertical acceleration sensor 2 and the lateral acceleration sensor 4 is located near a right door of the vehicle 1, and the pair of the vertical acceleration sensor 3 and the lateral acceleration sensor 5 is located near a left door of the vehicle 1. Alternatively, the pair of the vertical acceleration sensor 2 and the lateral acceleration sensor 4 and the pair of the vertical acceleration sensor 3 and the lateral acceleration sensor 5 can be located in the center of the vehicle 1 and separated from each other by a predetermined distance.

In an example shown in FIG. 1, the vertical acceleration sensor 2 and the lateral acceleration sensor 4 are integrated together into a single two-axis sensor, and the vertical acceleration sensor 3 and the lateral acceleration sensor 5 are integrated together into a single two-axis sensor. Alternatively, the vertical acceleration sensor 2 and the lateral acceleration sensor 4 can be separate sensors, and the vertical acceleration sensor 3 and the lateral acceleration sensor 5 can be separate sensors.

The lateral acceleration sensors 4 and 5 are installed on the vehicle 1 in such a manner that the lateral acceleration sensors 4 and 5 detect lateral acceleration of the vehicle 1 to detect a side collision of the vehicle 1. Alternatively, the lateral acceleration sensors 4 and 5 can be installed on the vehicle 1 in such a manner that the lateral acceleration sensors 4 and 5 detect longitudinal acceleration of the vehicle 1 to detect a front or rear collision of the vehicle 1.

The vertical acceleration sensor 2 outputs a vertical acceleration signal Gzr indicative of vertical acceleration of the vehicle 1 to a central processing unit (CPU) 6. The vertical acceleration sensor 3 outputs a vertical acceleration signal Gzl indicative of vertical acceleration of the vehicle 1 to the CPU 6. The CPU 6 calculates vertical velocity signals Vzr and Vzl by integrating the acceleration signals Gzr and Gzl, respectively. Then, the CPU 6 calculates a rollover angular velocity Wx by multiplying a half width L1 of the vehicle 1 by a difference between the velocity signals Vzr and Vzl. Then, the CPU 6 calculates a rollover angle θ of the vehicle 1 by integrating the rollover angular velocity Wx. The CPU 6 determines whether a rollover of the vehicle 1 occurs based on whether the rollover angular velocity Wx exceeds a predetermined threshold velocity and based on whether the rollover angle θ exceeds a predetermined threshold angle. When the CPU 6 determines that a rollover of the vehicle 1 occurs, the CPU 6 outputs an activation signal to an occupant protection device 7 in order to activate the occupant protection device 7. Output signals of the lateral acceleration sensors 4 and 5 are inputted to the CPU 6, and the CPU 6 can use the output signals of the lateral acceleration sensors 4 and 5 to determine whether the rollover occurs. Further, the CPU 6 can use the output signals of the lateral acceleration sensors 4 and 5 to determine whether a side collision of the vehicle 1 occurs. When the CPU 6 determines that the side collision occurs, the CPU 6 outputs the activation signal to the occupant protection device 7 in order to activate the occupant protection device 7. For example, the occupant protection device 7 can include a curtain airbag, a side airbag, and a front airbag.

Figure 2A:
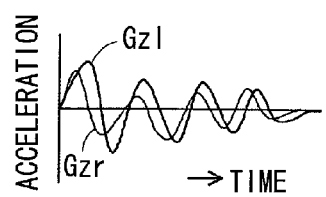
FIG. 2A is a diagram illustrating output signals of vertical acceleration sensors when the vehicle does not roll over.
Figure 2B:
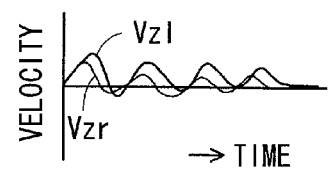
FIG. 2B is a diagram illustrating integral values of the output signals shown in FIG. 2A.

As shown in FIG. 2A, in a normal running state where the vehicle 1 does not roll over, the difference between the acceleration signals Gzr and Gzl is small. Accordingly, the difference between the velocity signals Vzr and Vzl becomes small. Therefore, the rollover angular velocity Wx becomes too small to detect a rotation behavior of the vehicle 1 caused by a rollover of the vehicle 1.

Figure 3A:
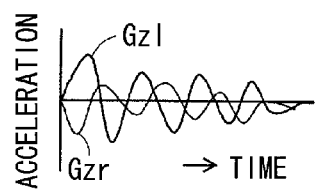
FIG. 3A is a diagram illustrating output signals of the vertical acceleration sensors when the vehicle rolls over.
Figure 3B:
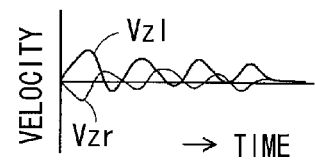
FIG. 3B is a diagram illustrating integral values of the output signals shown in FIG. 3A.

In contrast, as shown in FIG. 3A, when the vehicle 1 rolls over, the difference between the acceleration signals Gzr and Gzl is large. Accordingly, the difference between the velocity signals Vzr and Vzl becomes large. Therefore, the rollover angular velocity Wx becomes large enough to detect the rotation behavior of the vehicle 1 caused by a rollover of the vehicle 1.

Assuming that the vertical acceleration sensor 2 and the lateral acceleration sensor 4 are integrated together into a single two-axis sensor, and the vertical acceleration sensor 3 and the lateral acceleration sensor 5 are integrated together into a single two-axis sensor, each two-axis sensor has the same output characteristics. In the event of a rollover of the vehicle 1, vertical acceleration of the vehicle 1 becomes about 20 G. In contrast, in the event of a side collision of the vehicle 1, lateral acceleration of the vehicle 1 ranges from about 100 G to about 200 G. Therefore, a difference between the output signal of each of the lateral acceleration sensors 4 and 5 and the output signal of each of the vertical acceleration sensors 2 and 3 is very large. For this reason, at an input interface section of the CPU 6, a measurement range of each of the vertical acceleration sensors 2 and 3 is smaller than a measurement range of each of the lateral acceleration sensors 4 and 5. That is, the output signal of each of the vertical acceleration sensors 2 and 3 is amplified by a gain greater than a gain by which the output signal of each of the lateral acceleration sensors 4 and 5 is amplified, so that each output signal can become the same level. In such an approach, measurement resolution is improved so that the acceleration of the vehicle 1 can be detected with high accuracy.

Figure 4:
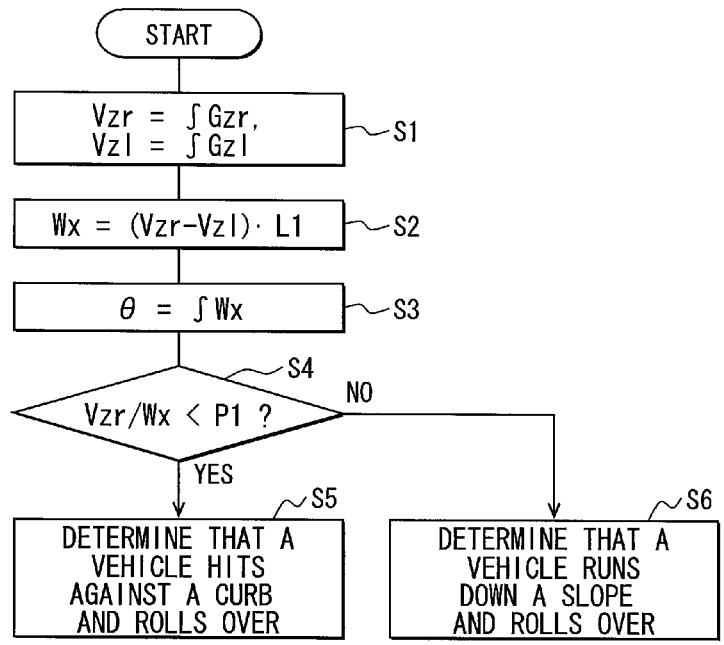
FIG. 4 is a flow chart of a rollover identification process.

The CPU 6 performs a rollover identification process shown in FIG. 4 to identify types of rollovers based on the velocity signals Vzr and Vzl, and the rollover angular velocity Wx.

Figure 5:
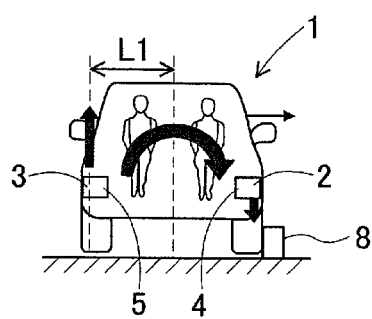
FIG. 5 is a diagram illustrating a situation where the vehicle hits against a curb of a road and then rolls over.
Figure 6:
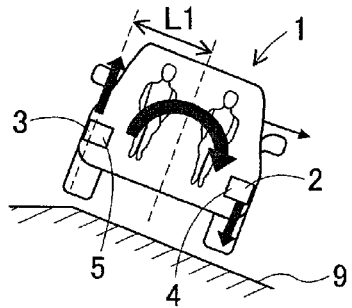
FIG. 6 is a diagram illustrating a situation where the vehicle runs down a slope and then rolls over.

As shown in FIG. 4, the rollover identification process starts at S1, where the CPU 6 calculates the velocity signals Vzr and Vzl by integrating the acceleration signals Gzr and Gzl, respectively. Then, the rollover identification process proceeds to S2, where the CPU 6 calculates the rollover angular velocity Wx by multiplying the half width L1 of the vehicle 1 by the difference between the velocity signals Vzr and Vzl. Then, the rollover identification process proceeds to S3, where the CPU 6 calculates the rollover angle θ by integrating the rollover angular velocity Wx. Then, the rollover identification process proceeds to S4, where the CPU 6 determines whether a ratio (i.e., Vzr/Wx) of the velocity signal Vzr to the rollover angular velocity Wx is smaller than a predetermined value P1. The predetermined value P1 is set according to the type of the vehicle 1. The velocity signal Vzr represents a vertical downward velocity on right side of the vehicle 1. If the ratio Vzr/Wx is smaller than the predetermined value P1 corresponding to YES at S4, the rollover identification process proceeds to S5. At S5, the CPU 6 determines that the vehicle 1 skids on a road, hits against a curb 8 of the road, and then rolls over, as shown in FIG. 5. At this time, detection values of the lateral acceleration sensors 4 and 5 obtained when the vehicle 1 hits against the curb 8 can be used by the CPU 6 to identify the types of rollovers. Thus, the CPU 6 can effectively identify the types of rollovers and activate the occupant protection device 7 such as a curtain airbag instantly. In contrast, if the ratio Vzr/Wx is not smaller than the predetermined value P1 corresponding to NO at S4, the rollover identification process proceeds to S6. At S6, the CPU 6 determines that the vehicle 1 runs down a slope 9 and then rolls over, as shown in FIG. 6. In the case of FIG. 6, the CPU 6 can determine that the there is no need to activate the occupant protection device 7 instantly. Thus, the CPU 6 can activate the occupant protection device 7 slowly.

It is noted that FIGS. 4, 5, and 6 are based on the assumption that the vehicle 1 rolls over to the right. If the vehicle 1 rolls over to the left, the CPU 6 determines at S4 whether a ratio (i.e., Vzl/Wx) of the velocity signal Vzl to the rollover angular velocity Wx is smaller than a predetermined value P1. The velocity signal Vzl represents a vertical downward velocity on left side of the vehicle 1.

As described above, according to the embodiment, the rollover detection apparatus includes a pair of vertical acceleration sensors 2 and 3. The vertical acceleration sensor 2 is mounted on the vehicle 1 and outputs the vertical acceleration signal Gzr indicative of vertical acceleration of the vehicle 1. The vertical acceleration sensor 3 is mounted on the vehicle 1 and outputs the vertical acceleration signal Gzl indicative of vertical acceleration of the vehicle 1. The vertical acceleration sensors 2 and 3 are spaced away from each other in the lateral direction of the vehicle 1. The rollover detection apparatus further includes the CPU 6 that determines whether a rollover of the vehicle 1 occurs based on the difference between the vertical acceleration signals Gzr and Gzl. Thus, the rollover detection apparatus can detect a rollover of the vehicle 1 without a roll rate sensor.

Further, the CPU 6 calculates the velocity signals Vzr and Vzl by integrating the acceleration signals Gzr and Gzl, respectively. The CPU 6 calculates the rollover angular velocity Wx of the vehicle 1 based on the difference between the velocity signals Vzr and Vzl. The CPU 6 calculates the rollover angle θ of the vehicle 1 by integrating the rollover angular velocity Wx. The CPU 6 determines whether the rollover occurs based on the rollover angular velocity Wx and the rollover angle θ. Thus, the rollover detection apparatus can effectively detect the rollover without a roll rate sensor.

Correspondence between terms used in the embodiment and claims is as follows. The CPU 6 corresponds to a rollover determining section, an angular velocity calculating section, a rollover angle calculating section, and a rollover-type identifying section. The CPU 6 serves as the angular velocity calculating section by performing S1 and S2 of the rollover identification process shown in FIG. 4. The CPU 6 serves as the rollover angle calculating section by performing S3 of the rollover identification process. The CPU 6 serves as the rollover-type identifying section by performing S4 of the rollover identification process.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An apparatus for detecting a rollover of a vehicle, the apparatus comprising:
    a first vertical acceleration sensor mounted on the vehicle and configured to output a first vertical acceleration signal indicative of vertical acceleration of the vehicle;
    a second vertical acceleration sensor mounted on the vehicle and configured to output a second vertical acceleration signal indicative of the vertical acceleration of the vehicle, the second vertical acceleration sensor spaced away from the first vertical acceleration sensor in a lateral direction of the vehicle;
    a rollover determining section configured to determine whether the rollover occurs based on a difference between the first and second vertical acceleration signals;
    an angular velocity calculating section configured to calculate a first velocity signal by integrating the first vertical acceleration signal and calculate a second velocity signal by integrating the second vertical acceleration signal, the angular velocity calculating section configured to calculate a rollover angular velocity of the vehicle based on a difference between the first and second velocity signals;
    a rollover angle calculating section configured to calculate a rollover angle of the vehicle by integrating the rollover angular velocity, wherein the rollover determining section determines whether the rollover occurs based on the rollover angular velocity and the rollover angle; and
    a rollover-type identifying section configured to identify a type of the rollover based on a ratio between one of the first and second velocity signals and the rollover angular velocity.

2. The apparatus according to claim 1, further comprising:
    a first lateral hacceleration sensor mounted on the vehicle and configured to output a first lateral acceleration signal indicative of lateral acceleration of the vehicle; and
    a second lateral acceleration sensor mounted on the vehicle and configured to output a second lateral acceleration signal indicative of the lateral acceleration of the vehicle, wherein
    the first vertical acceleration sensor and the first lateral acceleration sensor are integrated together into a first single two-axis sensor, and
    the second vertical acceleration sensor and the second lateral acceleration sensor are integrated together into a second single two-axis sensor.

3. The apparatus according to claim 2, wherein
    the rollover determining section determines whether the rollover occurs based on the first and second lateral acceleration signals.

4. The apparatus according to claim 2, wherein
    the rollover determining section determines whether a side collision of the vehicle occurs based on the first and second lateral acceleration signals.

5. The apparatus according to claim 2, wherein
    each of the first and second vertical acceleration sensors has a first measurement range,
    each of the first and second lateral acceleration sensors has a second measurement range larger than the first measurement range.

6. The apparatus according to claim 1, wherein the rollover-type identifying section is configured to identify the type of the rollover based on comparison between the ratio and a predetermined value.

7. The apparatus according to claim 6, wherein the rollover-type identifying section is configured
    to identify a first type of the rollover that the vehicle skids on a road, hits against a curb of the road, and then rolls over, if the ratio is smaller than the predetermined value and
    to identify a second type of the rollover that that the vehicle runs down a slope and then rolls over, if the ratio is not smaller than the predetermined value.

8. The apparatus according to claim 7, further comprising:
    a section configured
    to activate an occupant protection device instantly if the rollover-type identifying section identifies the first type of the rollover and
    to activate the occupant protection device slowly if the rollover-type identifying section identifies the second type of the rollover.

\* \* \* \* \*